(12) United States Patent
Miyake et al.

(10) Patent No.: US 12,254,309 B2
(45) Date of Patent: *Mar. 18, 2025

(54) VEHICLE CONTROL SYSTEM AND METHOD FOR CONFIRMING SOFTWARE CONSISTENCY

(71) Applicant: TOYOTA JIDOSHA KABUSHIKI KAISHA, Toyota (JP)

(72) Inventors: Masaki Miyake, Toyota (JP); Teppei Fukuzawa, Toyota (JP); Shuji Matsuno, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,975

(22) Filed: Feb. 8, 2023

(65) Prior Publication Data

US 2023/0185566 A1 Jun. 15, 2023

Related U.S. Application Data

(63) Continuation of application No. 17/347,897, filed on Jun. 15, 2021, now Pat. No. 11,604,636, which is a
(Continued)

(30) Foreign Application Priority Data

Mar. 7, 2018 (JP) ................................ 2018-040981

(51) Int. Cl.
*G06F 9/44* (2018.01)
*B60R 16/023* (2006.01)
(Continued)

(52) U.S. Cl.
CPC .............. *G06F 8/65* (2013.01); *B60R 16/023* (2013.01); *G06F 8/71* (2013.01); *G06F 21/57* (2013.01)

(58) Field of Classification Search
CPC ............ G06F 8/65; G06F 8/71; B60R 16/023
See application file for complete search history.

(56) References Cited

U.S. PATENT DOCUMENTS

2006/0130039 A1* 6/2006 Yuuki ....................... G06F 8/65
717/168
2006/0174242 A1 8/2006 Zhu et al.
(Continued)

FOREIGN PATENT DOCUMENTS

JP 2008-290667 A 12/2008
JP 2009-053920 A 3/2009
(Continued)

OTHER PUBLICATIONS

Jul. 14, 2021 Notice of Allowance issued in U.S. Appl. No. 16/279,290.
(Continued)

*Primary Examiner* — Hang Pan
(74) *Attorney, Agent, or Firm* — Oliff PLC

(57) ABSTRACT

A specific on-board device, that is any one of a plurality of on-board devices, is configured to acquire the versions of software included in other on-board devices when the power source of a vehicle is turned on. The specific on-board device determines whether or not the versions of the software of all the on-board devices that constitute a vehicle control system are consistent, by comparing the version of the software of the specific on-board device and the versions of the software acquired from the other on-board devices with first consistency information prestored.

6 Claims, 10 Drawing Sheets

Related U.S. Application Data continuation of application No. 16/279,290, filed on Feb. 19, 2019, now Pat. No. 11,169,793.

(51) Int. Cl.
    *G06F 8/65*     (2018.01)
    *G06F 8/71*     (2018.01)
    *G06F 21/57*     (2013.01)

(56) References Cited

U.S. PATENT DOCUMENTS

| | | |
|---|---|---|
| 2007/0294575 A1 | 12/2007 | Aichelen et al. |
| 2009/0222811 A1* | 9/2009 | Faus ............... G06F 8/65 717/173 |
| 2010/0146497 A1* | 6/2010 | Kogan ............... G06F 8/65 717/170 |
| 2010/0313192 A1* | 12/2010 | Natsume ............... G06F 8/65 717/168 |
| 2011/0138188 A1 | 6/2011 | Lee et al. |
| 2012/0216183 A1 | 8/2012 | Mahajan et al. |
| 2013/0305238 A1 | 11/2013 | Frayssignes et al. |
| 2014/0344799 A1 | 11/2014 | Thodati et al. |
| 2015/0309784 A1 | 10/2015 | Molin et al. |
| 2015/0378719 A1 | 12/2015 | Yasutake |
| 2016/0170775 A1 | 6/2016 | Rockwell et al. |
| 2017/0286099 A1* | 10/2017 | Wilkinson ............... G06F 8/65 |
| 2017/0371649 A1* | 12/2017 | Li ............... G06F 8/71 |
| 2018/0152341 A1 | 5/2018 | Maeda et al. |

FOREIGN PATENT DOCUMENTS

| | | |
|---|---|---|
| JP | 2017-059210 A | 3/2017 |
| WO | 2016/048326 A1 | 3/2016 |

OTHER PUBLICATIONS

Jul. 20, 2022 Office Action Issued In U.S. Appl. No. 17/347,897.

Nov. 21, 2022 Notice of Allowance Issued in U.S. Appl. No. 17/347,897.

* cited by examiner

FIG. 3

| | |
|---|---|
| SYSTEM NUMBER | 00001 |
| ON-BOARD DEVICE A | 12345 |
| ON-BOARD DEVICE B | 23456 |
| ON-BOARD DEVICE C | 34567 |
| ON-BOARD DEVICE D | 45678 |

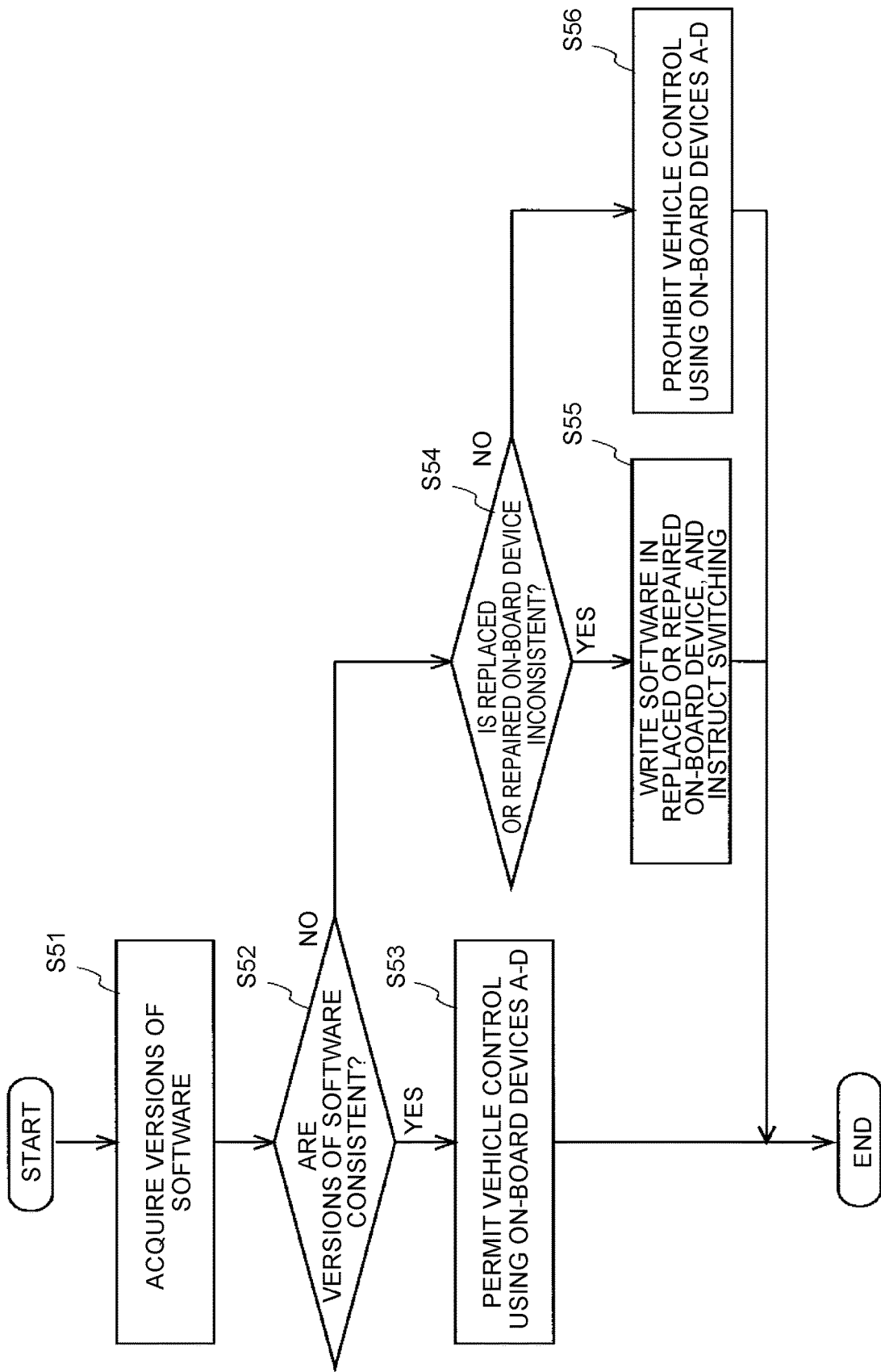

VEHICLE CONTROL SYSTEM AND METHOD FOR CONFIRMING SOFTWARE CONSISTENCY

This application is a continuation application of U.S. patent application Ser. No. 17/347,897, filed Jun. 15, 2021, which is in turn a continuation application of U.S. patent application Ser. No. 16/279,290, filed on Feb. 19, 2019, which claims priority to Japanese Patent Application No. 2018-040981, filed on Mar. 7, 2018. The disclosure of each application, including the specification, drawings and abstract, is incorporated herein by reference in its entirety.

BACKGROUND

1. Technical Field

The present disclosure relates to a vehicle control system and a method for confirming software consistency.

2. Description of Related Art

Japanese Patent Application Publication No. 2009-53920 (JP 2009-53920 A) discloses a system that updates ECU programs with upgrade programs transmitted from a server. In the system of JP 2009-53920 A, occurrence of operation failure attributed to inconsistent versions of the ECU programs is prevented by determining whether or not to update an ECU program with reference to information on dependency relation between an upgrade program for the ECU program to be updated and other ECU programs, before the pertinent program is updated.

SUMMARY

When the versions of a plurality of on-board programs are inconsistent, unexpected vehicle control may possibly be performed. Although the system of JP 2009-53920 A confirms the dependency relation between a program to be updated and other programs at the time of updating, confirming the dependency relation at the time of updating the program may be insufficient to prevent the unexpected vehicle control.

The present disclosure provides a vehicle control system and a method for confirming software consistency capable of further reducing the possibility of unexpected vehicle control performed due to inconsistent versions of a plurality of on-board software.

A vehicle control system according to a first aspect of the present disclosure includes a plurality of on-board devices, wherein any one of the on-board devices is a specific on-board device and the specific on-board device includes: a first consistency information storage unit; a version acquisition unit; and a first determination unit. The first consistency information storage unit is configured to prestore first consistency information including a permitted combination of versions of software of all the on-board devices that constitute the vehicle control system. The version acquisition unit is configured to acquire versions of the software included in other on-board devices when a power source of a vehicle is turned on. The other on-board devices are the on-board devices other than the specific on-board device. The first determination unit is configured to determine, when the version acquisition unit acquires the versions of the software from the other on-board devices, whether or not the versions of the software of all the on-board devices that constitute the vehicle control system are consistent, by comparing the version of the software of the specific on-board device and the versions of the software acquired from the other on-board devices with the first consistency information.

In the vehicle control system according to the above aspect, a specific on-board device determines whether or not the versions of the software of all the on-board devices that constitute the vehicle control system are consistent, when the power source of the vehicle is turned on. This makes it possible to further reduce the possibility of unexpected vehicle control performed due to inconsistent versions of the on-board software.

In the above aspect, the specific on-board device may further include: a first transmission unit; and a reception unit. The first transmission unit may be configured to transmit, when the first determination unit determines that the versions of the software of all the on-board devices that constitute the vehicle control system are inconsistent, version information including the versions of the software of all the on-board devices that constitute the vehicle control system to an external server. The reception unit may be configured to receive from the external server determination result information that is information on a determination result determined by the external server based on the version information transmitted by the first transmission unit. The determination result information indicates whether or not the versions of the software of all the on-board devices that constitute the vehicle control system are consistent.

According to the above configuration, even when a specific on-board device fails to confirm the consistency of the versions of the software, the consistency of the versions of the software can be confirmed based on the determination result in the external server. Therefore, the consistency of the versions of the software can be determined with high accuracy.

In the above aspect, the on-board devices may each be configured to retain the software of a current version and the software of a previous version. The first consistency information storage unit may be configured to store the first consistency information in the current version and the first consistency information in the previous version. The specific on-board device may further include a switching instruction unit configured to instruct, when the first transmission unit fails to communicate with the external server, the other on-board devices to switch execution target software to the software of the previous versions. The version acquisition unit may be configured to acquire, after the switching instruction unit instructs to switch the software, the versions of the software after switching from the other on-board devices. The first determination unit may be configured to determine whether or not the versions of the software of all the on-board devices that constitute the vehicle control system are consistent, by comparing the version of the software of the specific on-board device after switching and the versions of the software after switching acquired from the other on-board devices with the first consistency information in the previous version.

According to the configuration, when the vehicle is in the environment where communication with the external server is not possible, the software of the on-board devices is switched to the software of previous versions. Hence, the consistency of the software of all the on-board devices that constitute the vehicle control system can be secured at an early stage.

In the above aspect, the specific on-board device may further include: a software acquisition unit; and a software update unit. The software acquisition unit may be configured to acquire, when any one of the other on-board devices fails, the software of a version at a time of failure of a failed on-board device from an external server and retain the software. The software update unit may be configured to update, when the on-board device is replaced or repaired, and then the first determination unit determines that the version of the software of the replaced or repaired on-board device is inconsistent with the first consistency information, the software of the replaced or repaired on-board device with the software retained in the software acquisition unit. The version acquisition unit may be configured to acquire from the other on-board devices the versions of the software after software update by the software update unit. The first determination unit may be configured to determine whether or not the versions of the software of all the on-board devices that constitute the vehicle control system are consistent, by comparing the version of the software of the specific on-board device and the versions of the software acquired from the other on-board devices with the first consistency information.

According to the configuration, even when the versions of the software of all the on-board devices that constitute the vehicle control system become inconsistent due to replacement or repair of the on-board devices, and a sufficient wireless communication environment is not available to the vehicle, it is possible to swiftly restore the state where the versions of the software of all the on-board devices are consistent.

In the above aspect, the external server may include: a second consistency information storage unit; a second determination unit; and a second transmission unit. The second consistency information storage unit may be configured to prestore second consistency information including a permitted combination of the versions of software of all the on-board devices that constitute the vehicle control system. The second determination unit may be configured to determine whether or not the versions of the software of all the on-board devices that constitute the vehicle control system are consistent, by comparing the versions of the software of all the on-board devices that constitute the vehicle control system with the second consistency information based on the version information transmitted from the first transmission unit. The second transmission unit may be configured to transmit to the specific on-board device a determination result by the second determination unit as the determination result information.

According to the configuration, the consistency of the versions of the software of all the on-board devices that constitute the vehicle control system can be confirmed based on the second consistency information retained in the external server. This makes it possible to determine the consistency of the versions of the software of the on-board devices with higher accuracy.

In the above aspect, the specific on-board device may further include a consistency information update unit. The consistency information update unit may be configured to update, when the second determination unit determines that the versions of the software of all the on-board devices that constitute the vehicle control system are consistent, the first consistency information stored in the first consistency information storage unit.

According to the configuration, the first consistency information retained in a representative on-board device can be updated based on the determination result in the external server. Hence, the vehicle control system can swiftly perform the consistency determination process next time without communicating with the external server.

In the above aspect, the specific on-board device may further include an update instruction unit. The update instruction unit may be configured to instruct, when the second determination unit determines that the versions of the software of all the on-board devices that constitute the vehicle control system are inconsistent, the on-board device retaining the software of a version inconsistent with the second consistency information that is used for determination by the second determination unit to perform software update.

According to the configuration, the software of the version that is inconsistent with the second consistency information can be updated based on the determination result in the external server. Hence, it is possible to swiftly restore the state where the versions of the software of all the on-board devices are consistent.

A method for confirming software consistency according to a second aspect of the present disclosure is executed on a computer included in any one specific on-board device out of a plurality of on-board devices that constitute a vehicle control system. The method for confirming software consistency includes: prestoring; acquiring; and determining. The prestoring is for prestoring first consistency information including a permitted combination of versions of software of all the on-board devices that constitute the vehicle control system. The acquiring is for acquiring versions of the software in other on-board devices when a power source of a vehicle is turned on. The determining is for determining, when the versions of the software are acquired from the other on-board devices, whether or not the versions of the software of all the on-board devices that constitute the vehicle control system are consistent, by comparing the version of the software of the specific on-board device and the versions of the software acquired from the other on-board devices with the first consistency information.

In the method for confirming software consistency according to the above aspect, the specific on-board device determines whether or not the versions of the software of all the on-board devices that constitute the vehicle control system are consistent, when the power source of the vehicle is turned on. This makes it possible to further reduce the possibility of unexpected vehicle control performed due to inconsistent versions of the software of the on-board devices.

The present disclosure allows further reduction in the possibility of unexpected vehicle control performed due to inconsistent versions of the software of a plurality of on-board devices.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 shows one example of a consistency table stored in a consistency information storage unit shown in FIG. 2;

FIG. 10 is a flowchart showing one example of a consistency confirmation process executed by the representative on-board device in the vehicle control system according to the third embodiment.

DETAILED DESCRIPTION OF EMBODIMENTS

Outline

In a vehicle control system according to the present disclosure, one of a plurality of on-board devices that constitute the vehicle control system confirms the consistency of the versions of software, whenever the power source of a vehicle is turned on, to reduce the possibility of unexpected vehicle control performed due to inconsistent versions of the software.

First Embodiment

Configuration

Figure 1:
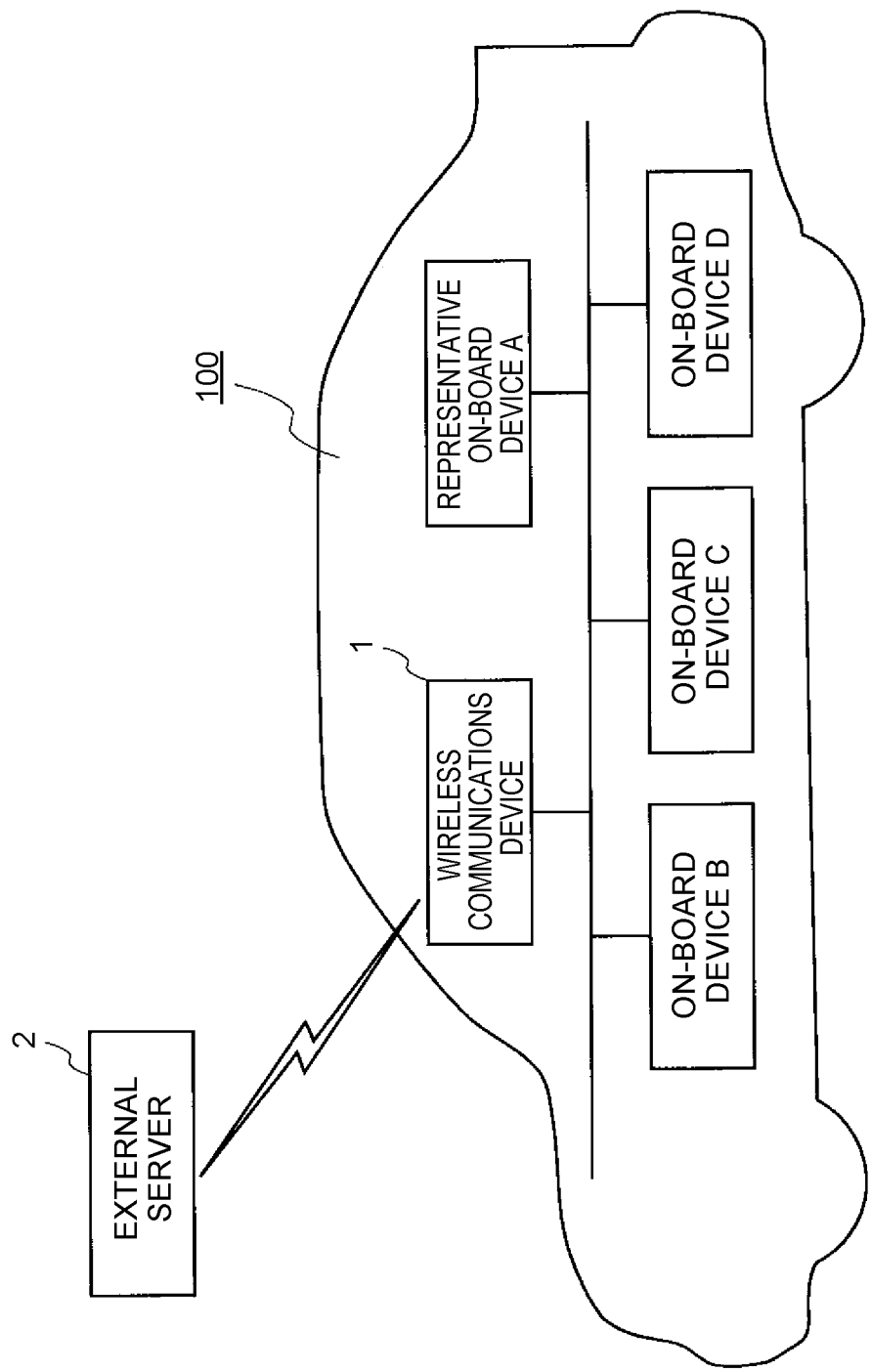
FIG. 1 is a block diagram showing the schematic configuration of a vehicle control system according to a first embodiment.

FIG. 1 is a block diagram showing the schematic configuration of a vehicle control system according to a first embodiment.

A vehicle control system 100 is a system constituted of on-board devices A to D that can communicate with each other. The system implements specified vehicle control by combining the functions of the on-board devices A to D. In the example of FIG. 1, the vehicle control system 100 is constituted of four on-board devices A to D. However, the number of the on-board devices that constitute the vehicle control system 100 is not limited to four. Examples of the specified vehicle control implemented by the vehicle control system 100 may include automatic driving. The on-board devices A to D correspond to ECUs that control vehicle travel functions, such as acceleration, deceleration, and steering, and to an ECU that offers travel assistance by combining the ECUs that control the vehicle travel functions. The on-board devices A to D can communicate with an external server 2 through a wireless communications device 1. In the following description, a specific on-board device A that is one of the plurality of on-board devices A to D that constitute the vehicle control system is called "representative on-board device A."

Figure 2:
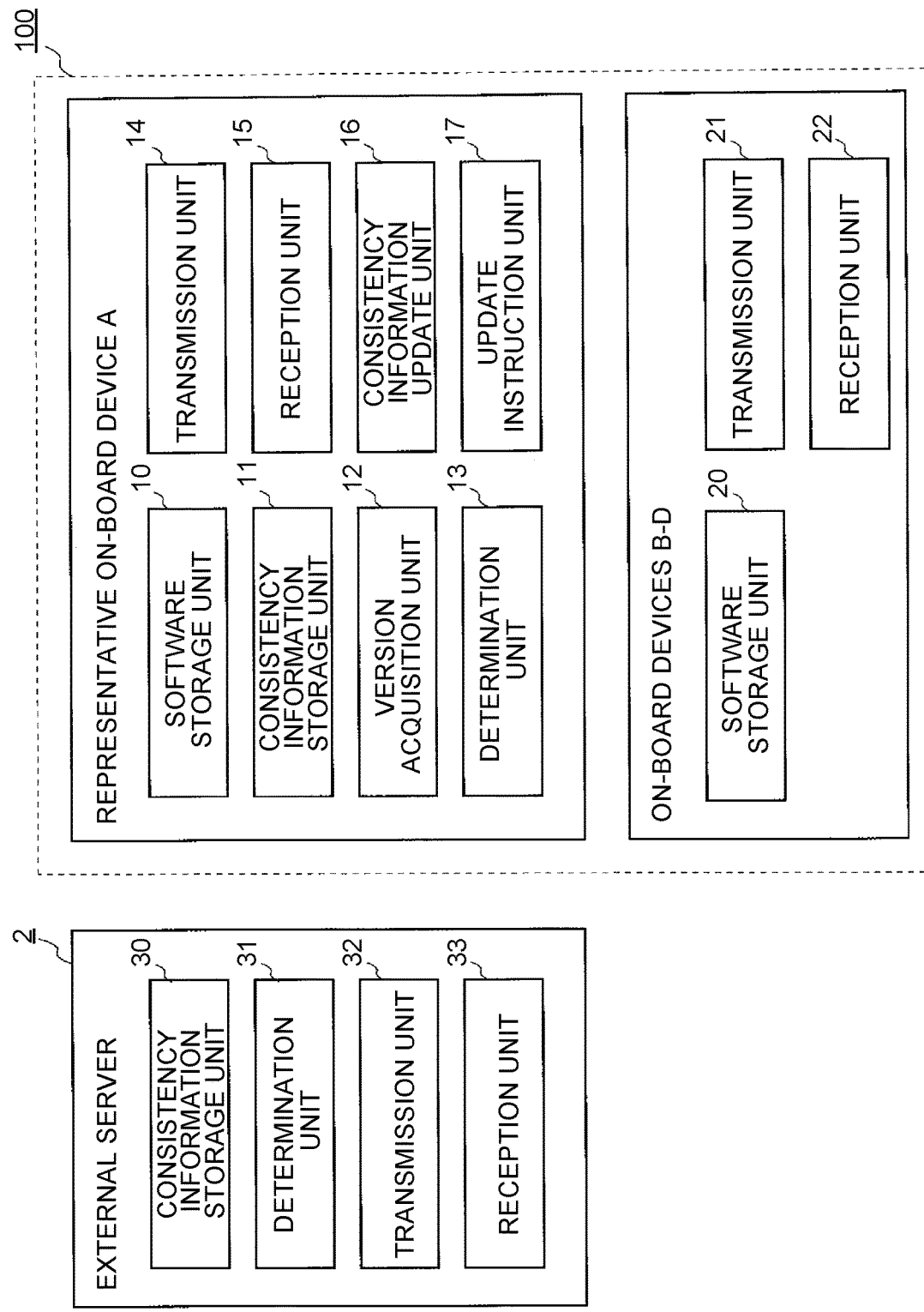
FIG. 2 is a functional block diagram of the vehicle control system shown in FIG. 1.

FIG. 2 is a functional block diagram of the vehicle control system shown in FIG. 1. FIG. 3 shows one example of a consistency table stored in a consistency information storage unit shown in FIG. 2.

Representative On-Board Device a

Although the representative on-board device A is one of the on-board devices that provide a control function of the vehicle control system 100, the representative on-board device A functions as a master device in a process of confirming consistency of software versions of the on-board devices A to D. When the power source of a vehicle is turned on, the representative on-board device A confirms the consistency of versions of the software of all the on-board devices A to D that constitute the vehicle control system 100. The representative on-board device A includes a software storage unit 10, a consistency information storage unit 11, a version acquisition unit 12, a determination unit 13, a transmission unit 14, a reception unit 15, a consistency information update unit 16, and an update instruction unit 17.

The software storage unit 10 stores software for operating the representative on-board device A. The representative on-board device A implements specified functions for controlling the operation of the vehicle by executing the software stored in the software storage unit 10.

The consistency information storage unit 11 prestores a consistency table that defines a combination of the versions of the software of all the on-board devices A to D that constitute the vehicle control system 100. The combination of the versions of the software of the on-board devices A to D defined in the consistency table is a combination of the versions that is confirmed to normally operate the vehicle control system 100. The combination is also a combination of the versions permitted to be executed. For example, the consistency table may include a system number that identifies the vehicle control system 100, and software versions of the on-board devices A to D, as shown in FIG. 3. As the system number, an identifier that identifies the vehicle control system 100 may be used, or the version of the vehicle control system 100 may be used. Although the consistency table defines a single version for each of the on-board devices in the example of FIG. 3, the consistency table may define the range of the versions of the on-board devices that can be combined. The consistency table may also define a plurality of combinations of versions (or the range of the versions) that are permitted to be concurrently executed. When one on-board device retains a plurality of software, the consistency table defines a permitted version of each of the software. The consistency table is used as consistency information (first consistency information) for the later-described determination unit 13 to determine whether or not the versions of the software of the on-board devices A to D are consistent.

Whenever the power source of the vehicle is turned on, the version acquisition unit 12 acquires the version of each software in the other on-board devices B to D through communication. When there is any on-board device that retains a plurality of software in the on-board devices B to D, the version acquisition unit 12 acquires the versions of all the software retained in the pertinent on-board device.

Whenever the version acquisition unit 12 acquires the versions of the software from the other on-board devices B to D, the determination unit 13 determines whether or not the versions of the software of all the on-board devices A to D that constitute the vehicle control system 100 are consistent. The determination unit 13 makes the determination by comparing the versions of the software stored in the software storage unit 10 of the representative on-board device A and the versions of the software that the version acquisition unit 12 acquires from the other on-board devices B to D with the consistency information stored in the consistency information storage unit 11. When determining that the versions of the software of all the on-board devices A to D that constitute the vehicle control system 100 are consistent based on the consistency table stored in the consistency information storage unit 11, the determination unit 13 permits execution of the specified vehicle control that is implemented by a combination of the functions of the on-board devices A to D.

When the determination unit 13 determines that the versions of the software of all the on-board devices A to D that constitute the vehicle control system 100 are inconsistent, the transmission unit 14 transmits version information including the versions of the software of the on-board devices A to D to the external server 2. The version information transmitted by the transmission unit 14 is used in the external server 2 to reconfirm whether or not the versions of the software of the on-board devices A to D are consistent.

The reception unit 15 receives various pieces of information transmitted from the external server 2. One piece of the information that the reception unit 15 receives from the external server 2 is determination result information. The determination result information indicates whether or not the versions of the software of the on-board devices A to D are consistent. The determination result information can be obtained as a result of determination made by the external server 2 based on the version information received from the transmission unit 14.

The transmission unit 14 and the reception unit 15 communicate with the external server 2 through the wireless communications device 1 shown in FIG. 1.

The consistency information update unit 16 updates the consistency information stored in the consistency information storage unit 11, when the determination result information received by the reception unit 15 indicates that the versions of the software of the on-board devices A to D are consistent. The consistency information update unit 16 may update the consistency information by replacing the combination of the versions of the software included in the consistency table (first consistency information) stored in the consistency information storage unit 11 with a combination of current versions of the software of the on-board devices A to D, or by adding the combination of the current versions of the software of the on-board devices A to D to the consistency table stored in the consistency information storage unit 11. The consistency information update unit 16 may update the consistency information by acquiring an updated consistency table from the external server 2, and replacing the consistency table stored in the consistency information storage unit 11 with the consistency table acquired from the external server 2.

When the determination result information received by the reception unit 15 indicates that the versions of the software of the on-board devices A to D are inconsistent, the update instruction unit 17 instructs the on-board device retaining the software inconsistent with the combination of the permitted versions to perform software update.

On-Board Devices B to D

The on-board devices B to D each include a software storage unit 20, a transmission unit 21, and a reception unit 22.

The software storage unit 20 stores software for operating each of the on-board devices B to D. The on-board devices B to D each implement specified functions for controlling the operation of the vehicle by executing the software stored in the software storage unit 10.

The transmission unit 21 transmits the version of the software stored in the software storage unit 20 to the representative on-board device A. The transmission unit 21 may transmit the version of the software to the representative on-board device A when the power source of the vehicle is turned on. Alternatively, the transmission unit 21 may transmit the version of the software to the representative on-board device A in response to a request from the representative on-board device A that is transmitted when the power source of the vehicle is turned on.

The reception unit 22 receives various pieces of information transmitted from the representative on-board device A or the external server 2.

External Server 2

The external server 2 includes a consistency information storage unit 30, a determination unit 31, a transmission unit 32, and a reception unit 33.

The consistency information storage unit 30 prestores a consistency table that defines a combination of the versions of the software of all the on-board devices A to D that constitute the vehicle control system 100. The combination of the software of the on-board devices A to D defined in the consistency table is a combination of the versions that are confirmed to normally operate the vehicle control system 100. The combination is also a combination of the versions permitted to be executed. The consistency table stored in the consistency information storage unit 30 may include a system number that identifies the vehicle control system 100, and software versions of the on-board devices A to D, as in the case illustrated in FIG. 3. The consistency table is used as consistency information (second consistency information) for the later-described determination unit 31 to determine whether or not the versions of the software of the on-board devices A to D are consistent.

The determination unit 31 determines whether or not the versions of the software of all the on-board devices A to D that constitute the vehicle control system 100 are consistent. The determination unit 31 makes the determination by comparing the versions of the software of the on-board devices A to D included in the version information received from the representative on-board device A with the consistency table stored in the consistency information storage unit 30. The external server 2 can manage the software of all the versions of the on-board devices A to D. Therefore, as compared with the consistency table stored in the consistency information storage unit 11 of the representative on-board device A, the consistency table stored in the consistency information storage unit 30 can define a larger number of permitted combinations of the versions of the software of the on-board devices A to D. Therefore, even when the representative on-board device A fails to confirm the consistency of the versions of the software, it is possible to determine the consistency of the versions of the software of the on-board devices A to D with high accuracy by making a determination again in the external server 2.

The transmission unit 32 transmits determination result information that is the result of determination by the determination unit 31 to the representative on-board device A. The determination result information indicates whether or not the versions of the software of the on-board devices A to D are consistent.

The reception unit 33 receives various pieces of information transmitted from the representative on-board device A.

Control Process

The control process executed by the representative on-board device A will be described below with reference to FIGS. 2 and 4.

Figure 4:
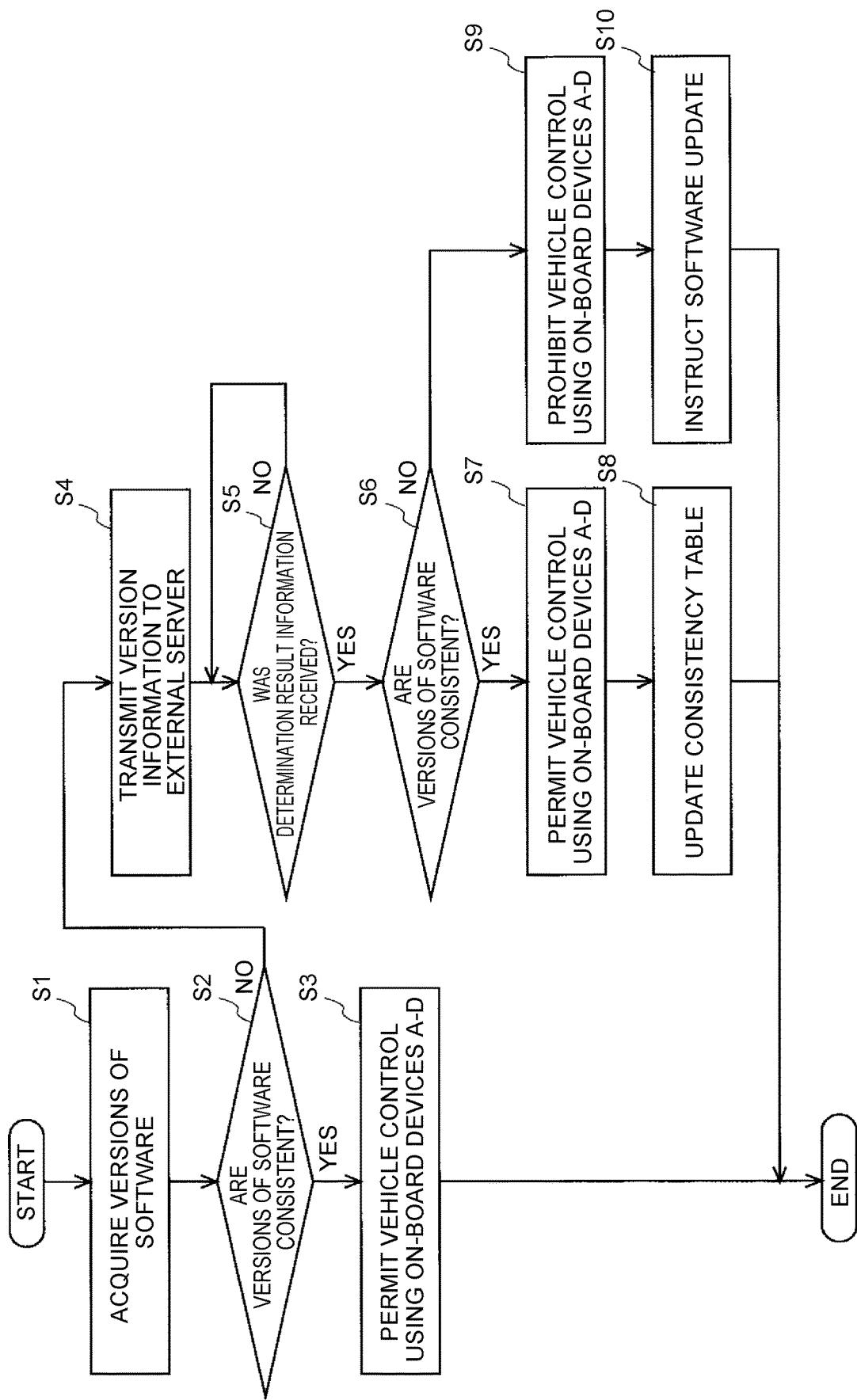
FIG. 4 is a flowchart showing one example of a process of confirming consistency executed by a representative on-board device in the vehicle control system according to the first embodiment.

FIG. 4 is a flowchart showing one example of a process of confirming consistency executed by the representative on-board device in the vehicle control system according to the first embodiment. The control process shown in FIG. 4 is executed when the power source of the vehicle is turned on.

Step S1: the version acquisition unit 12 acquires the versions of the software of the other on-board devices B to D. Then, the process shifts to step S2.

Step S2: the determination unit 13 compares the version of the software of the representative on-board device A and the versions of the software acquired from the other on-board devices B to D with the consistency table stored in the consistency information storage unit 11 to determine whether the versions of the software of the on-board devices A to D are consistent. When the determination result in step S2 is YES, the process shifts to step S3. Otherwise, the process shifts to step S4.

Step S3: the determination unit 13 permits execution of vehicle control using a combination of the on-board devices A to D. Then, the determination unit 13 ends the process.

Step S4: the transmission unit 14 transmits version information including the version of the software of the representative on-board device A, and the versions of the software acquired from the other on-board devices B to D to the external server 2. Then, the process shifts to step S5.

Step S5: the reception unit 15 determines whether or not the determination result information was received from the external server 2. When the determination result in step S5 is YES, the process shifts to step S6. Otherwise, after waiting for a predetermined time, the reception unit 15 performs the determination process of step S5 again. When the state where the reception unit 15 is unable to receive the determination result information from the external server 2 continues for a predetermined time (timeout time) in step S5, the reception unit 15 determines timeout, and ends the process of step S5. The process then proceeds to step S6.

Step S6: the determination unit 13 determines whether or not the versions of the software of the on-board devices A to D are consistent based on the determination result information received from the external server 2. When the determination result in step S6 is YES, the process shifts to step S7. Otherwise, the process shifts to step S9. When the reception unit 15 determines timeout in step S5, the determination unit 13 determines the versions of the software of the on-board devices A to D are inconsistent.

Step S7: the determination unit 13 permits execution of the vehicle control using a combination of the on-board devices A to D. Then, the process shifts to step S8.

Step S8: the consistency information update unit 16 updates the consistency table stored in the consistency information storage unit 11. As described before, the consistency table may be updated by using the versions of the software used for determination in step S2, or may be updated by using the consistency table acquired from the external server 2 through the reception unit 15. Then, the process is ended.

Step S9: the determination unit 13 prohibits execution of the vehicle control using a combination of the on-board devices A to D. Then, the process shifts to step S10.

Step S10: the update instruction unit 17 instructs an on-board device retaining the software of a version inconsistent with the consistency table stored in the consistency information storage unit 11 to perform software update. Then, the update instruction unit 17 ends the process.

When the update instruction unit 17 instructs software update, and the on-board device to be updated completes reception of updated software from the server 2, a user may be encouraged to temporarily turn off and then turn on the power source of the vehicle again so as to switch the execution target software from the software of the current version to the updated software.

When the software of any one of the on-board devices is updated based on the update instruction in step S10, the consistency information update unit 16 may update the consistency table stored in the consistency information storage unit 11 as necessary.

Effects

In the vehicle control system 100 according to the present embodiment, the representative on-board device A acquires the versions of the software of the on-board devices B to D when the power source of the vehicle is turned on, and determines whether or not the versions of the software of the on-board devices A to D are consistent based on the consistency table prepared in advance. Since the consistency of the versions of software is confirmed whenever the power source of the vehicle is turned on, it is possible to further reduce the possibility of unexpected vehicle control executed due to the inconsistent versions of the software of the on-board devices A to D.

In the vehicle control system 100 according to the present embodiment, when inconsistency is determined based on a consistency check of software versions (first check) by the representative on-board device A, the representative on-board device A transmits the versions of the software of the on-board devices A to D to the external server 2. The external server 2 then performs the consistency check of software versions again (secondary check) with use of the consistency table retained in the external server 2. Even when the representative on-board device A fails to confirm the consistency with the information that the representative on-board device A retains, the external server 2 performs the consistency check again with the information that the external server 2 retains. This makes it possible to determine whether or not the versions of the software of the on-board devices A to D are consistent with higher accuracy.

In the vehicle control system 100 according to the present embodiment, whether or not the versions of the software of the on-board devices A to D are consistent is determined by comparison with the consistency table prepared in advance. As a result of comparison, it is possible to identify which version of the software of which on-board device is consistent with the consistency table. Since the information, used to identify the on-board device that is inconsistent with the consistency table, is applicable to software update, repair, or the like, of the on-board devices, it becomes possible to cope with the situation where the versions of the software are inconsistent at early stages.

In the vehicle control system 100 according to the present embodiment, when the representative on-board device A determines that the versions of the software of the on-board devices A to D are inconsistent, and then the external server 2 determines that the versions of the software of the on-board devices A to D are consistent, it is possible to update the consistency table stored in the consistency information storage unit 11 of the representative on-board device A. If the consistency table stored in the consistency information storage unit 11 is updated, the representative on-board device A can confirm the consistency of the software versions by itself when the power source of the vehicle is turned on next time, unless the software of the on-board devices A to D is changed. Hence, the time taken for confirmation of the consistency can be shortened.

The representative on-board device A may be constituted of only the software storage unit 10, the consistency information storage unit 11, the version acquisition unit 12, and the determination unit 13 in the functional block of the representative on-board device A shown in FIG. 2. Accordingly, it is possible to constitute a simple vehicle control system that can determine only the consistency of the versions of the software of the on-board devices A to D when the power source of the vehicle is turned on. The transmission unit 14 and the reception unit 15 may further be added to this configuration to constitute a vehicle control system that allows the primary check in the representative on-board device A and the secondary check in the external server 2. It is also possible to constitute a vehicle control system with the consistency information update unit 16 or the update instruction unit 17 being excluded from the functional block of the representative on-board device A shown in FIG. 2.

Second Embodiment

Configuration

Figure 5:
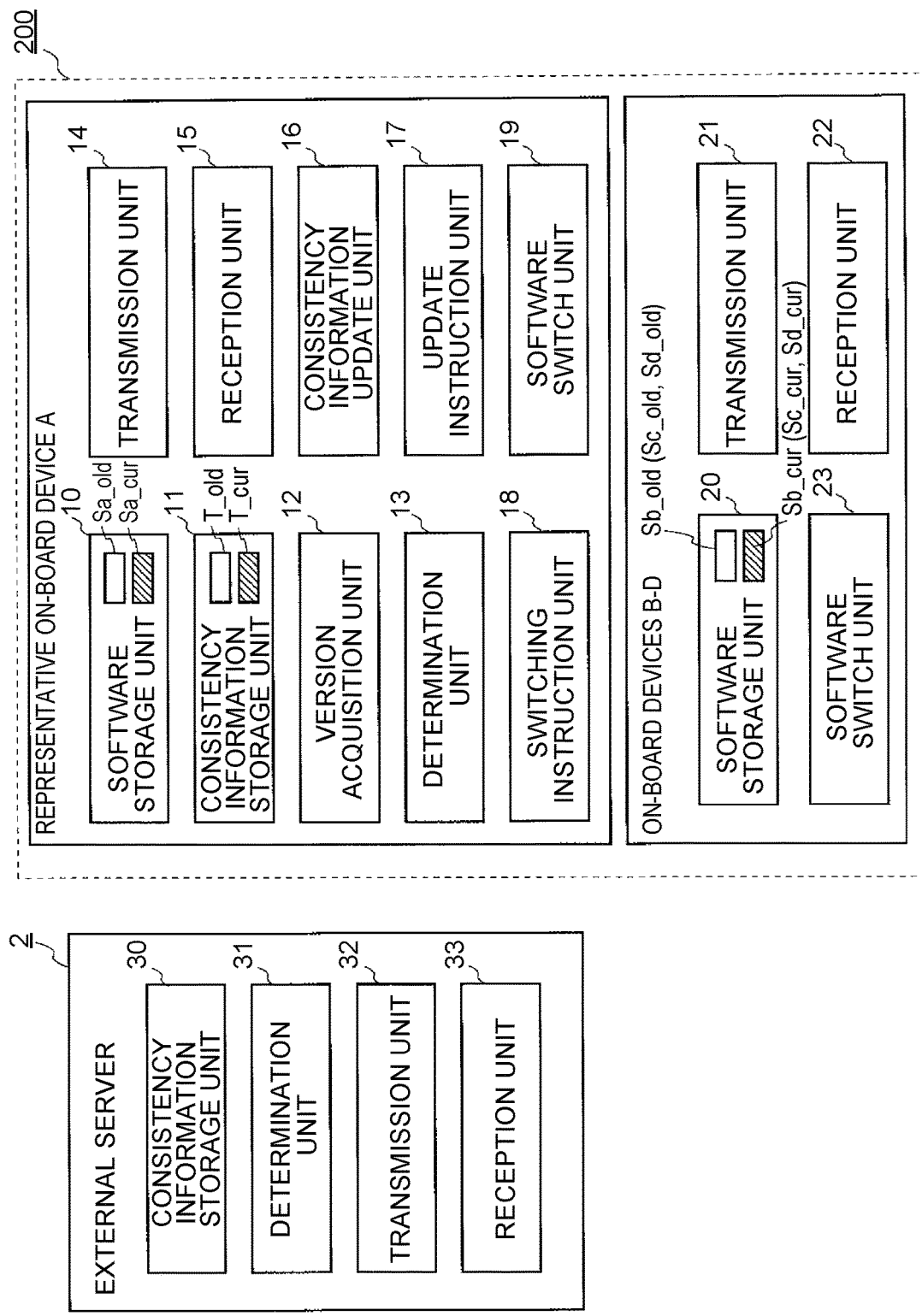
FIG. 5 is a functional block diagram of a vehicle control system according to a second embodiment.

FIG. 5 is a functional block diagram of a vehicle control system according to a second embodiment.

The vehicle control system 200 according to the second embodiment is characterized in that the consistency of the versions of the software of the on-board devices A to D can be secured even in the state where communication between the representative on-board device A and the external server 2 is not possible after the representative on-board device A determines that the versions of the software of the on-board devices A to D are inconsistent. Hereinafter, description is mainly given of the difference between the present embodiment and the first embodiment.

Representative On-Board Device a

The software storage unit 10 of the representative on-board device A stores software Sa_cur of a current version and software Sa_old of a previous version as the software for operating the representative on-board device A. The software Sa_cur of the current version and the software Sa_old of the previous version are stored in different storage regions in the software storage unit 10. At the time of software update, the software Sa_old of the previous version is deleted, the software of the current version is retained as the software of the previous version, and the updated software is newly stored as the software of the current version.

The consistency information storage unit 11 stores a consistency table T_cur of a current version and a consistency table T_old of a previous version as consistency information. At the time of update of the consistency information, the consistency table T_old of the previous version is deleted, the consistency table of the current version is retained as the consistency table of the previous version, and an updated consistency table is newly stored as the consistency table of the current version.

The representative on-board device A further includes a switching instruction unit 18 and a software switch unit 19.

When the determination unit 13 determines that the versions of the software of the on-board devices A to D are inconsistent, and the representative on-board device A is in the state where communication with the external server 2 is not possible, the switching instruction unit 18 instructs each of the on-board devices A to D to switch execution target software from the software of the current version to the software of the previous version. When the switching instruction unit 18 instructs the on-board devices A to D to switch the software, a user may be notified, by a display on the display unit or by voice, that the software is switched to the previous version.

When the switching instruction unit 18 instructs switching of the software, the software switch unit 19 switch execution target software from the software Sa_cur of the current version to the software Sa_old of the previous version. At the same time, the software switch unit 19 switches the consistency information used by the determination unit 13 from the consistency table T_cur of the current version to the consistency table T_old of the previous version. When the power source of the vehicle is turned on next time, the software switch unit 19 switches the software before the process of confirming the consistency of the versions of the software of the on-board devices A to D.

In the case where the switching instruction unit 18 instructs switching of the software, the version acquisition unit 12 and the determination unit 13 confirm the consistency of the versions of the software of the on-board devices A to D when the power source of the vehicle is turned on. The processes executed by the version acquisition unit 12 and the determination unit 13 are the same as normal processes performed when the power source is turned on. As a result of the processes, the version acquisition unit 12 acquires from the other on-board devices B to D the versions of the software after switching. The determination unit 13 confirms the consistency of the versions of software, by comparing the version of the software of the representative on-board device A after switching and the versions of the software acquired from the other on-board devices B to D after switching with the consistency table of the previous version.

On-Board Devices B to D

The software storage units 20 of the on-board devices B, C, D store software Sb_cur, Sc_cur, Sd_cur of a current version, and software Sb_old, Sc_old, Sd_old of a previous version as the software for operating the on-board device B, C, D. Also in the on-board devices B to D, the software of the current version and the software of the previous version are stored in different storage regions in the software storage units 20, respectively. At the time of software update, the software of the previous version is deleted, updated software is newly stored as the software of the current version, and the software of the current version is retained as the software of the previous version. The software Sa_old to Sd_old of the previous version is a combination of the software used before the software Sa_cur to Sa_cur of the current version, and is also a combination of the software having version consistency.

Each of the on-board devices B to D further includes a software switch unit 23. When the switching instruction unit 18 instructs switching of the software, the software switch unit 23 switches execution target software from the software Sb_cur, Sc_cur, Sd_cur of the current version to the software Sb_old, Sc_old, Sd_old of the previous version software, respectively. When the power source of the vehicle is turned on next time, the software switch unit 23 also switches the software before the process of confirming the consistency of the versions of the software of the on-board devices A to D.

Control Process

The control process executed by the representative on-board device A will be described below with reference to FIGS. 5 and 6.

Figure 6:
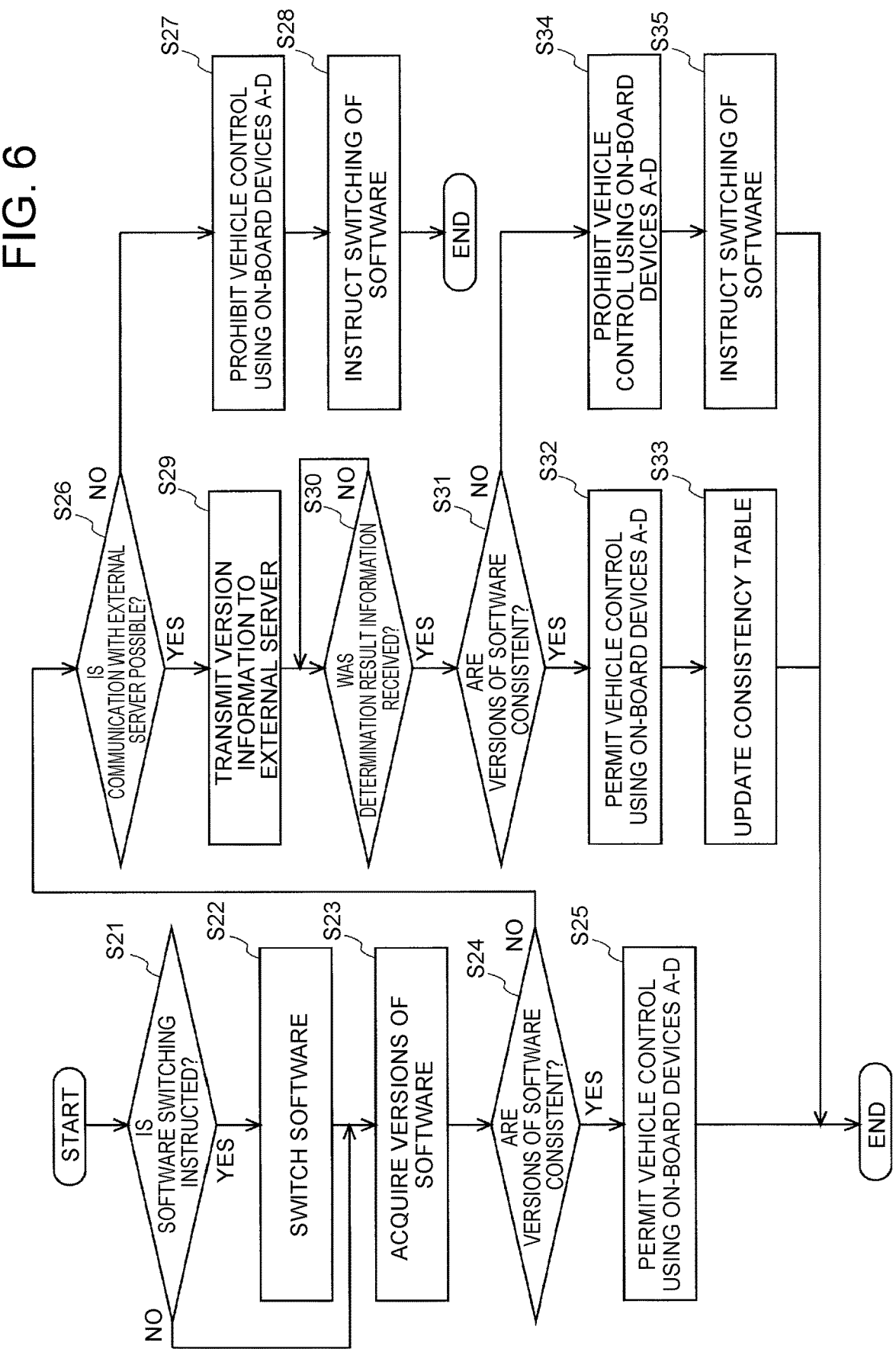
FIG. 6 is a flowchart showing one example of a consistency confirmation process executed by a representative on-board device in the vehicle control system according to the second embodiment.

FIG. 6 is a flowchart showing one example of a process of confirming consistency executed by a representative on-board device in the vehicle control system according to the second embodiment. The control process shown in FIG. 6 is executed when the power source of the vehicle is turned on.

Step S21: the software switch unit 19 determines whether or not switching of the software is instructed before the power source of the vehicle is turned on. In the case where an instruction is made for switching the software of the current version of the on-board devices A to D to the software of the previous version in later-described step S28, step S21 is a determination step necessary for performing the switching of the software when the power source is turned on for the first time after the instruction is made. Whether switching of the software is instructed before the power source of the vehicle is turned on may be determined based on a flag set in a nonvolatile storage region or the like. When the determination result in step S21 is YES, the process shifts to step S22. Otherwise, the process shifts to step S23.

Step S22: when it is determined that switching of the software is instructed in step S21, the software switch unit 19 switches execution target software from the software Sa_cur of the current version to the software Sa_old of the previous version. The software switch unit 19 also switches the consistency information used by the determination unit 13 from the consistency table T_cur of the current to the consistency table T_old of the previous version.

Although illustration is omitted, in other on-board devices that are instructed to switch software, the software switch unit 23 switches execution target software from the software of the current version to the software of the previous version, in parallel with the timing when the software is switched in the representative on-board device A.

Step S23: the version acquisition unit 12 acquires the versions of the software of the other on-board devices B to D. Then, the process shifts to step S24.

Step S24: the determination unit 13 determines whether or not the versions of the software of the on-board devices A to D are consistent, by comparing the version of the software of the representative on-board device A and the versions of the software acquired from the other on-board devices B to D with the consistency table stored in the consistency information storage unit 11. When the determination result in step S24 is YES, the process shifts to step S25. Otherwise, the process shifts to step S26.

Step S25: the determination unit 13 permits execution of the vehicle control using a combination of the on-board devices A to D. Then, the determination unit ends the process.

Step S26: the transmission unit 14 determines whether or not communication with the external server 2 is possible. The transmission unit 14 can determine whether or not communication is established with the external server 2 based on, for example, the signal strength of a radio signal that the reception unit 15 receives. When the determination result in step S26 is YES, the process shifts to step S29. Otherwise, the process shifts to step S27.

Step S27: the determination unit 13 prohibits execution of the vehicle control using a combination of the on-board devices A to D. Then, the process shifts to step S28.

Step S28: the switching instruction unit 18 instructs the on-board device, which needs to switch software from the software of the current version to the software of the previous version, to switch the software of the current version to the software of the previous version. Then, the switching instruction unit 18 ends the process.

When the switching instruction unit 18 instructs the on-board devices A to D to switch the software, the representative on-board device A may notify a user that the software is switched. The representative on-board device A may also encourage the user to temporarily turn off and then turn on the power source of the vehicle at the time when preparation of the process of switching software is completed.

Step S29: the transmission unit 14 transmits version information including the version of the software of the representative on-board device A and the versions of the software acquired from the other on-board devices B to D to the external server 2. Then, the process shifts to step S30.

Step S30: the reception unit 15 determines whether or not the determination result information was received from the external server 2. When the determination result in step S30 is YES, the process shifts to step S31. Otherwise, after waiting for a predetermined time, the reception unit 15 performs the determination step of step S30 again. When the state where the reception unit 15 is unable to receive the determination result information from the external server 2 continues for a predetermined time (timeout time) in step S30, the reception unit 15 determines timeout, and ends the process of step S30. The process then proceeds to step S31.

Step S31: the determination unit 13 determines whether or not the versions of the software of the on-board devices A to D are consistent based on the determination result information received from the external server 2. When the determination result in step S31 is YES, the process shifts to step S32. Otherwise, the process shifts to step S34. When the reception unit 15 determines timeout in step S30, the determination unit 13 determines that the versions of the software of the on-board devices A to D are inconsistent.

Step S32: the determination unit 13 permits execution of the vehicle control using a combination of the on-board devices A to D. Then, the process shifts to step S33.

Step S33: the consistency information update unit 16 updates the consistency information stored in the consistency information storage unit 11. Then, the consistency information update unit 16 ends the process.

Step S34: the determination unit 13 prohibits execution of the vehicle control using a combination of the on-board devices A to D. Then, the process shifts to step S35.

Step S35: the update instruction unit 17 instructs the on-board device retaining the software of a version inconsistent with the consistency table stored in the consistency information storage unit 11 to perform software update. Then, the update instruction unit 17 ends the process.

When the update instruction unit 17 instructs software update, and the on-board device to be updated completes reception of updated software from the server 2, a user may be encouraged to temporarily turn off and then turn on the power source of the vehicle again so as to switch the execution target software from the software of the current version to the updated software.

Effects

In the vehicle control system 200 according to the present embodiment, whether or not the versions of the software of the on-board devices A to D are consistent is determined when the power source of the vehicle is turned on as in the first embodiment. This makes it possible to further reduce the possibility of unexpected vehicle control executed due to the inconsistent versions of the software of the on-board devices A to D.

In addition, in the vehicle control system 200 according to the present embodiment, each on-board device retains the software of the previous version, and the representative on-board device A retains the consistency table of the previous version. Therefore, when the representative on-board device A determines that the versions of the software of the on-board devices A to D are inconsistent, but the representative on-board device A and the external server 2 are not in a communicable state, it is possible to switch to the software of the previous version. According to this configuration, when the latest versions of software are not consistent, and the representative on-board device A fails to communicate with the external server, the consistency of the versions of the software of the on-board devices A to D can be secured.

It is also possible to constitute a vehicle control system with the consistency information update unit 16 or the update instruction unit 17 being excluded from the functional block of the representative on-board device A shown in FIG. 5.

Third Embodiment

Configuration

Figure 7:
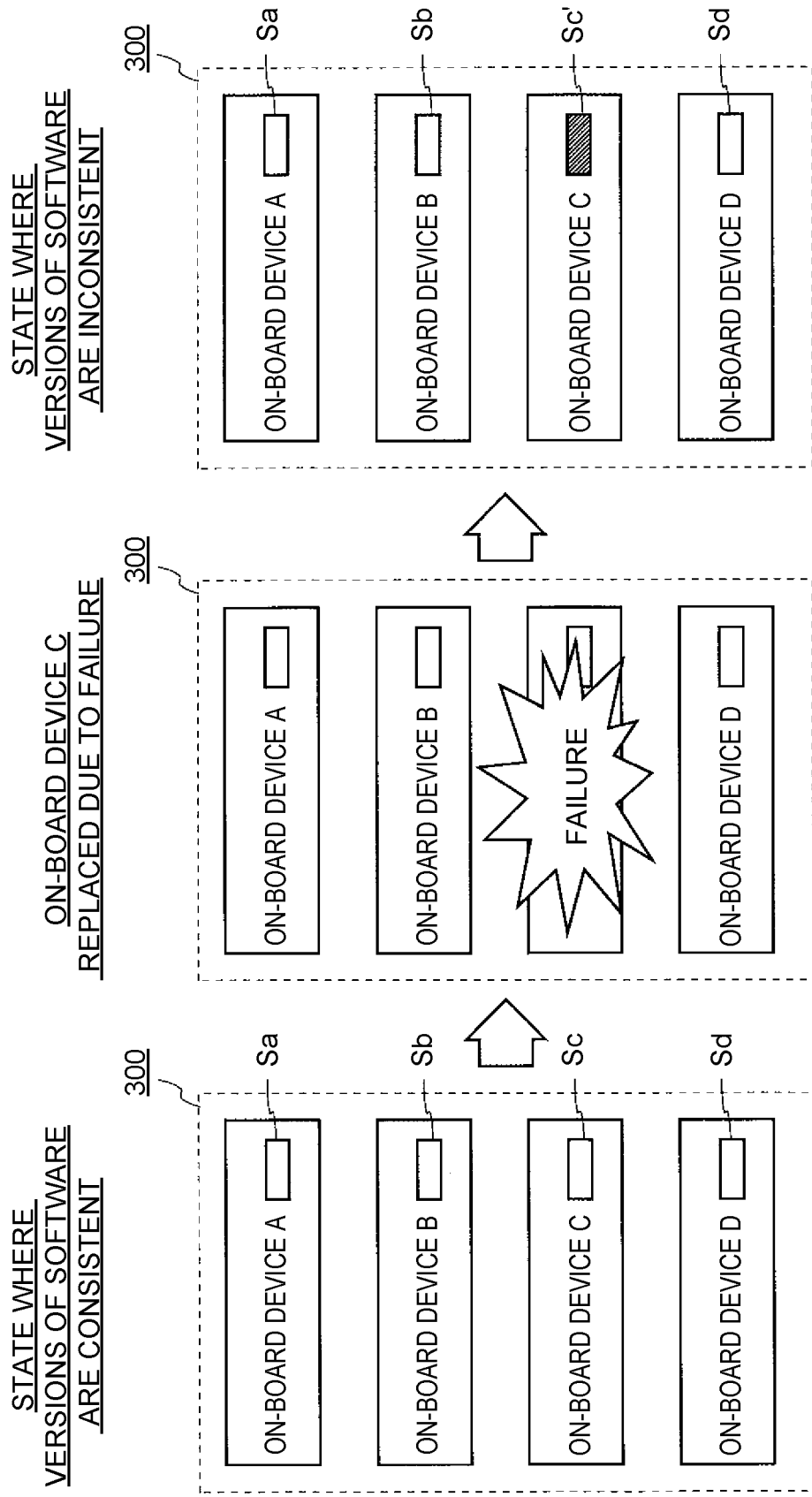
FIG. 7 is a schematic view for describing the background of a vehicle control system according to a third embodiment.

FIG. 7 is a schematic view for describing the background of a vehicle control system according to a third embodiment.

The on-board devices A to D that constitute a vehicle control system 300 have software having versions Sa to Sd that are consistent at the time of shipment of the vehicle (left column of FIG. 7). The consistency of the versions of the software of the on-board devices A to D may be compromised because of the versions being mismatched due to replacement of the on-board devices A to D, or replacement of components, such as substrates, included in the on-board devices A to D. For example, assume the case where the on-board device C fails (a central column of FIG. 7), and the failed on-board device C is replaced with a new on-board device. As a result of the replacement, the version of software Sc' of the new on-board device C may be different from the version of the software Sc before the replacement (right column of FIG. 7). In this case, the version Sc' of the software of the new on-board device C is not necessarily consistent with the versions of the software of the on-board devices A, B, D. Depending on the version of the software Sc', it may be difficult to confirm the software consistency of the on-board devices A to D through only the consistency confirmation process executed by the representative on-board device A. In the case where the vehicle is used at the places where a sufficient wireless communication environment is not available, such as undergrounds and mountain areas, it is difficult to confirm the consistency through communication with the external server. This may lead to the situation where the vehicle control functions implemented by a combination of the on-board devices A to D are assumed to be restricted, or software update may be assumed to take time. As a result, the convenience of the user may be deteriorated.

On the assumption of such problems, the vehicle control system according to the third embodiment is characterized in that the consistency of the versions of the software of the on-board devices A to D can swiftly be secured even when repair or replacement of the on-board devices A to D is needed. Hereinafter, description is mainly given of the difference between the present embodiment and the first embodiment.

Figure 8:
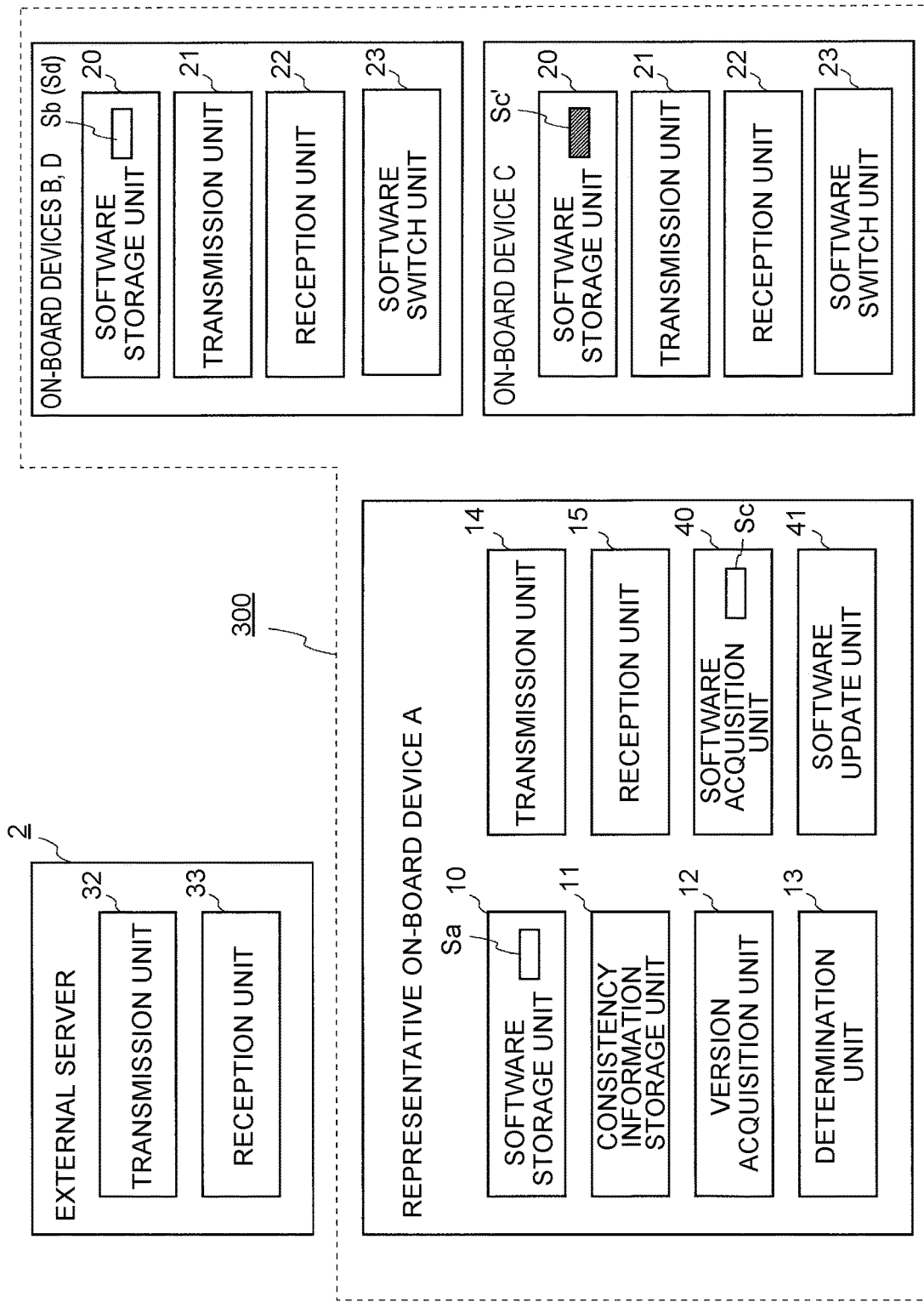
FIG. 8 is a functional block diagram of the vehicle control system according to the third embodiment.

FIG. 8 is a functional block diagram of the vehicle control system according to the third embodiment.

Representative On-Board Device a

In addition to the software storage unit 10, the consistency information storage unit 11, the version acquisition unit 12, the determination unit 13, the transmission unit 14, and the reception unit 15 described in the first embodiment, the representative on-board device A includes a software acquisition unit 40 and a software update unit 41.

When any one of the other on-board devices B to D fails, and replacement or repair is needed, the software acquisition unit 40 receives from the external server 2 the software of the current version of the failed on-board device while communication with the external server 2 is possible, and stores the acquired software. The software acquisition unit 40 is able to detect occurrence of failure in any one of the on-board devices B to D based on a failure notification output from the failed on-board device. FIGS. 7 and 8 shows an example in which the on-board device C fails. The software acquisition unit 40 acquires software Sc of the on-board device C, which is consistent with the versions of the software Sa, Sb, Sd of the on-board device A, B, D, from the external server 2, and stores the acquired software Sc. The version of the software that the software acquisition unit 40 acquires from the external server 2 may be acquired from the failed on-board device C through communication, or may be acquired from the consistency table stored in the consistency information storage unit 11.

When the determination unit 13 determines that the versions of the software of the on-board devices A to D are inconsistent after replacement or repair of the failed on-board device, and determines that the on-board device, which retains the software of the version that is determined to be inconsistent with the consistency table, is the replaced or repaired on-board device, the software update unit 41 writes the software to be stored in the software acquisition unit 40 in the software storage unit 20 of the replaced or repaired on-board device. Then, the software update unit 41 instructs the replaced or repaired on-board device to switch the software.

In the case where the software update unit 41 instructs switching of software, the version acquisition unit 12 and the determination unit 13 confirm the consistency of the versions of the software of the on-board devices A to D when the power source of the vehicle is turned on next time. The processes executed by the version acquisition unit 12 and the determination unit 13 are the same as normal processes performed when the power source is turned on.

On-Board Devices B to D

The on-board devices B to D may further include a software switch unit 23 same as the software switch unit described in the second embodiment. When the software update unit 41 instructs switching of the software, the software switch unit 23 switches execution target software from the software of the current version to the software written by the software update unit 41. The software switch unit 23 switches the software before the process of confirming the consistency of the versions of the software of the on-board devices A to D, when the power source of the vehicle is turned on next time. Control Process The control process executed by the representative on-board device A will be described below with reference to FIGS. 8 to 10.

Figure 9:
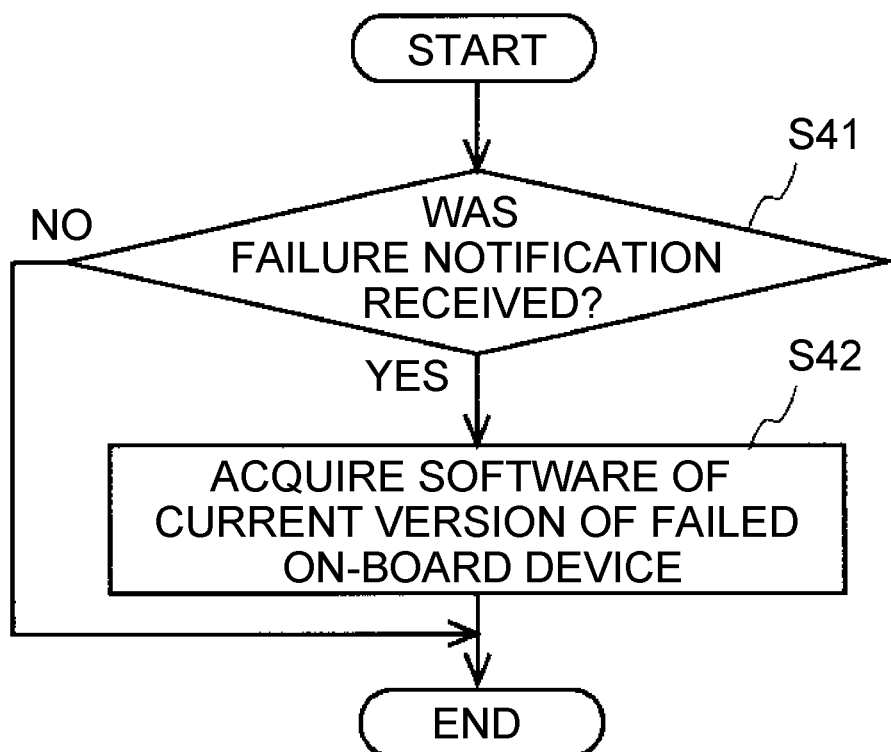
FIG. 9 is a flowchart showing one example of a software acquisition process executed by a representative on-board device in the vehicle control system according to the third embodiment.

FIG. 9 is a flowchart showing one example of a software acquisition process executed by the representative on-board device in the vehicle control system according to the third embodiment.

Step S41: the reception unit 15 determines whether or not a failure notification is received from the other on-board devices B to D. When the determination result in step S41 is YES, the process shifts to step S42. Otherwise, the reception unit 15 ends the step.

Step S42: the software acquisition unit 40 acquires the software of the current version of the failed on-board device from the external server 2, and stores the acquired software. Then, the software acquisition unit 40 ends the process.

FIG. 10 is a flowchart showing one example of a process of confirming consistency executed by the representative on-board device in the vehicle control system according to the third embodiment. The control process shown in FIG. 10 is executed when the power source of the vehicle is turned on.

Step S51: the version acquisition unit 12 acquires the versions of the software of the other on-board devices B to D. Then, the process shifts to step S52.

Step S52: the determination unit 13 determines whether or not the versions of the software of the on-board devices A to D are consistent, by comparing the version of the software of the representative on-board device A and the versions of the software acquired from the other on-board devices B to D with the consistency table stored in the consistency information storage unit 11. When the determination result in step S52 is YES, the process shifts to step S54. Otherwise, the process shifts to step S53.

Step S53: the determination unit 13 permits execution of the vehicle control using a combination of the on-board devices A to D. Then, the determination unit 13 ends the process.

Step S54: the determination unit 13 determines whether or not the on-board device having software of the version, which is inconsistent with the consistency table, is a replaced or repaired on-board device. Whether or not the on-board device is replaced or repaired can be identified based on the failure notification received in step S41 of FIG. 9. When the determination result in step S54 is YES, the process shifts to step S55. Otherwise, the process shifts to step S56.

Step S55: the software update unit 41 writes the software to be stored in the software acquisition unit 40 in a specified region of the software storage unit 20 of the replaced or repaired on-board device. The software update unit 41 then instructs the replaced or repaired on-board device to perform updating of software. Then, the process is ended.

Step S56: the determination unit 13 prohibits execution of the vehicle control with use of a combination of the on-board devices A to D. Then, the determination unit 13 ends the process.

When the software update unit 41 instructs switching of the software, a user may be encouraged to temporarily turn off and then turn on the power source of the vehicle again in order to switch execution target software of the replaced or repaired on-board device from the software of the current version to updated software. The representative on-board device A may temporarily turn off and then turn on again the power source of the on-board device which is instructed by the software update unit 41 to switch the software. In the on-board device instructed by the software update unit 41 to switch the software, the software switch unit 23 switches execution target software to the software written in the software storage unit 20 by the software update unit 41, when the power source is turned on next time.

Effects

In the vehicle control system 300 according to the present embodiment, whether or not the versions of the software of the on-board devices A to D are consistent is determined when the power source of the vehicle is turned on as in the first embodiment. This makes it possible to further reduce the possibility of unexpected vehicle control executed due to the inconsistent versions of the software of the on-board devices A to D.

In addition, in the vehicle control system 300 according to the present embodiment, when replacement or repair of the on-board devices B to D is needed due to failure, the representative on-board device A acquires from the external server 2 in advance the software of a failed on-board device which is confirmed to be consistent in advance. When the version of the software of the replaced or repaired on-board device is inconsistent with the consistency table after replacement or repair of the failed on-board device, the representative on-board device A switches the inconsistent software with the software acquired from the external server 2 in advance. Therefore, even when the versions of the software of the on-board devices A to D are inconsistent due to replacement or repair of an on-board device, and a sufficient wireless communication environment is not available, it is possible to swiftly restore the state where the on-board devices A to D are consistent. As a result, restrictions of the vehicle control functions implemented with a combination of the on-board devices A to D can be eliminated at an early stage, and therefore the convenience of the user can be improved.

The method for confirming software consistency according to the third embodiment may be combined with the vehicle control system 100 according to the first embodiment, or the vehicle control system 200 according to the second embodiment. Specifically, the vehicle control system 100 according to the first embodiment, or the vehicle control system 200 according to the second embodiment may further include the software acquisition unit 40 and the software update unit 41, and the representative on-board device A is configured to be able to execute the process of steps S41, S42 shown in FIG. 9 and the process of steps S54, S55 shown in FIG. 10. The process of steps S54, S55 shown in FIG. 10 is preferably executed after the primary check where the determination unit 13 determines that the versions of software are inconsistent, and before the external server 2 executes the secondary check. With such configuration, the consistency is preferentially determined with the information retained in the representative on-board device A, and when it is difficult to make the determination by only the representative on-board device A, the secondary check in the external server 2 is performed. Thus, the process of determining software consistency can efficiently be performed without communication. When there is a step (S26 of FIG. 6) of determining whether or not communication between the vehicle and the external server 2 is possible, and the vehicle is unable to communicate with the external server 2, the process of step S54, S55 of FIG. 10 may be executed.

Other Modifications

The control processes of FIGS. 4, 6, 9 and 10 may be implemented with dedicated circuitry, or may be implemented by causing a computer, such as an ECU having a processor, a ROM, a RAM, a hard disk, and the like, to execute the process of the respective steps. When the computer such as an ECU is caused to execute the control processes of FIGS. 4, 6, 9 and 10, programs described to enable execution of the control processes may be prestored in a storage device, such as a ROM or a hard disk, such that the programs may be read from the storage device and executed by the processor included in the computer.

In the embodiments described above, one of the on-board devices that provide the control functions of the vehicle control system confirms the consistency of the versions of software as a representative on-board device. However, the above-described control process may be executed by an on-board device dedicated to confirming the consistency of the versions of software.

The present disclosure can be used for the vehicle control system that implements specified vehicle control functions with a combination of a plurality of on-board devices.

What is claimed is:

1. A device mounted on a vehicle, the device comprising a processor configured to:
   instruct at least one on-board device of a plurality of on-board devices to switch software mounted on the at least one on-board device, the plurality of on-board devices implementing an on-board system;
   acquire version information indicating versions of the software of all of the on-board devices of the on-board system after instructing the at least one on-board device to switch; and confirm whether the versions indicated in the acquired version information form a combination that allows the on-board system to operate properly;
   instruct the plurality of on-board devices to restore the software before switching when i) the processor confirms that the versions do not form the combination and ii) the vehicle is unable to communicate with an external server; and
   operate as a communication unit configured to
      receive confirmation result information transmitted from the external server, the confirmation result information being made by the external server based on the version information transmitted from the processor, and the confirmation result information indicating whether the versions form the combination, and transmit the version information to the external server and receive the confirmation result information from the external server when iii) the processor confirms that the versions do not form the combination and iv) the vehicle is able to communicate with the external server; and
      confirm whether the versions form the combination based on the received confirmation result information.

2. The device according to claim 1, further comprising a memory storing a combination of the versions of the software before switching that are permitted to be executed simultaneously and a combination of the versions of the software after switching that are permitted to be executed simultaneously, wherein, after instructing to restore the software before switching, the processor is configured to:
   acquire restored version information indicating restored versions of the restored software of all of the on-board devices; and
   confirm whether the restored versions form the combination that allows the on-board system to operate properly by comparing the restored versions and the combination of the versions of the software before switching that are permitted to be executed simultaneously.

3. The device according to claim 1, wherein the processor is configured to permit execution of the on-board system in response to a confirmation that the versions form the combination.

4. A vehicle comprising the device according to claim 1.

5. A method executed by a device mounted on a vehicle comprising:
   instructing at least one on-board device of a plurality of on-board devices to switch software mounted on the at least one on-board device, the plurality of on-board devices implementing an on-board system;
   acquiring version information indicating versions of the software of all of the on-board devices of the on-board system after instructing the at least one on-board device to switch;
   confirming whether the versions indicated in the acquired version information form a combination that allows the on-board system to operate properly;
   instructing the plurality of on-board devices to restore the software before switching when i) the processor confirms that the versions do not form the combination and ii) the vehicle is unable to communicate with an external server;
   receiving confirmation result information transmitted from the external server, the confirmation result information being made by the external server based on the version information, and the confirmation result information indicating whether the versions form the combination, and transmitting the version information to the external server and receiving the confirmation result information from the external server when iii) confirmed that the versions do not form the combination and iv) the vehicle is able to communicate with the external server; and
   confirming whether the versions form the combination based on the received confirmation result information.

6. A non-transitory storage medium storing instructions that are executable by a processor and that cause the processor to perform functions comprising:
   instructing at least on-board device of a plurality of on-board devices to switch software mounted on the at least one on-board device, the plurality of on-board devices implementing an on-board system;
   acquiring version information indicating versions of the software of all of the on-board devices of the on-board system after instructing the at least one on-board device to switch; and
   confirming whether the versions indicated in the acquired version information form a combination that allows the on-board system to operate properly;
   instructing the plurality of on-board devices to restore the software before switching when i) the processor confirms that the versions do not form the combination and ii) the vehicle is unable to communicate with an external server;
   receiving confirmation result information transmitted from the external server, the confirmation result information being made by the external server based on the version information transmitted from the processor, and the confirmation result information indicating whether the versions form the combination, and transmitting the version information to the external server and receiving the confirmation result information from the external server when iii) the processor confirms that the versions do not form the combination and iv) the vehicle is able to communicate with the external server; and confirming whether the versions form the combination based on the received confirmation result information.

* * * * *